United States Patent [19]
Nabi

[11] 3,760,374
[45] Sept. 18, 1973

[54] PROCESS CONTROL SYSTEM

[75] Inventor: Saleh A. Nabi, Sharon, Mass.

[73] Assignee: The Foxboro Company, Foxboro, Mass.

[22] Filed: Apr. 6, 1972

[21] Appl. No.: 241,546

[52] U.S. Cl. .............................................. 340/172.5
[51] Int. Cl. ........................................... G06f 15/46
[58] Field of Search ............................... 340/172.5

[56] References Cited
UNITED STATES PATENTS

| 3,434,113 | 3/1969 | Wiley | 340/172.5 |
| 3,509,539 | 4/1970 | Fichten | 340/172.5 |
| 3,374,464 | 3/1968 | Brothman | 340/172.5 |
| 3,267,434 | 8/1966 | Clark | 340/172.5 |
| 3,425,038 | 1/1969 | Trousdale | 340/172.5 |
| 3,579,197 | 5/1971 | Stapleford | 340/172.5 |
| 3,526,757 | 9/1970 | Rees | 340/172.5 X |
| 3,597,743 | 8/1971 | Murphy | 340/172.5 |

Primary Examiner—Paul J. Henon
Assistant Examiner—Sydney R. Chirlin
Attorney—Lawrence H. Poeton

[57] ABSTRACT

An electronic process control system including a digital computer, a computer interface that is easily replaceable in order to change computer types; a logic module for grouping the computer and controller signals and converting betwen digital and analog representations; and a control unit interface for generating analog signals for a control unit in response to computer commands and adapting the analog control unit to communicate with a digital computer.

13 Claims, 3 Drawing Figures

PROCESS CONTROL SYSTEM

BACKGGROUND OF THE INVENTION

1. Field of the Invention

This invention relates to electronic process control systems that include both analog control units and digital computers. This invention is particularly applicable to the five following process control system configurations, all of which may be achieved with the same basic equipment:

a. DDC, Direct Digital Control systems in which the computer drives the control signal output of the system. Analog control units may be provided as a backup for the computer to generate the control signal outputs.

b. DDC with SPT, Direct Digital Control with Set Point Tracking systems which are similar to DDC systems with the addition of a computer controlled set point source for the back-up analog control units.

c. SPC, Set Point Control systems in which the computer controls the set point source but the analog control units generate the control signal output.

d. DDC with SPT and R/L, Direct Digital Control with Set Point Tracking and Remote-Local switching systems in which the computer may also control the set point mode, that is, the computer may choose between a computer controlled or an external analog set point source.

e. SPC with R/L, Set Point Control with Remote-Local switching systems which are similar to SPC with the addition of computer control of the set point mode.

In any of the above, the computer may also be required to control the output mode, that is, the choice between the manual and automatic modes of operation of the analog control unit.

2. Description of the Prior Art

In conventional process control systems utilizing computers, communication between the analog control units and the digital computers has presented many problems. In particular, communication between computer and controller has required the design of special Input/Output (I/O) gear and special control units both usable only with a particular computer type. This limitation is an important part of the cost of process control equipment. This fact is also important because the control units have a much longer design life than the computers.

The conventional system structure places the I/O equipment physically adjacent to the computer. This is required by the design of the I/O equipment as an extension of the computer. This arrangement, in addition to its inflexibility with regard to computer and controller types, presents intricate grounding problems, that is, the analog ground must be carried to the computer.

In addition, the complexities of the interconnections between the computer, I/O and controllers require that the system be completely set up in its field location before it can be tested.

Because the I/O equipment must be placed physically adjacent to the computer, the computer-I/O combination must be as close as possible to the control units in view of the expense and difficulty in transmitting analog signals for any great distance.

Another major difficulty related to conventional system configurations is the computer time required for certain activities. The computers are inherently much faster than the analog or I/O gear so that computer time is wasted waiting for the analog equipment to respond to a demand from the computer.

SUMMARY OF THE INVENTION

It is an object of the instant invention to provide a process control system configuration that minimizes the difficulties inherent in conventional systems. It is a particular object of the instant invention to provide a configuration with flexibility, that is, one wherein the computer type may be changed with a minimum of difficulty. It is a further object to provide a system wherein the I/O equipment may be associated directly with the analog control units rather than the computer. It is a still further object of the invention to provide a process control system including a digital computer and analog control units where the control units may be conveniently utilized in other systems without a computer.

These and other objects are accomplished by the instant invention in the following manner. A system configuration is presented wherein the conventional I/O equipment is replaced by three stages of signal handling, each individually designed for greatest efficiency for its particular purpose. These are:

1. A Computer Interface (CI) designed for each type of computer and required merely to rearranged the computer output into a format required by the instant invention. 2. A Control Unit Interface (CUI) designed independently of the choice of computer for computer compatible controllers and required to convert status and pulse signals to logic and analog voltages. In the absence of control units a CUI may be used to generate the output control signal directly from the computer signals. 3. A Logic module designed to be compatible with any type of digital computer. This unit is required to perform some of the functions of conventional I/O equipment but is able to satisfy the objects of the invention because the data it handles is in a predictable format designed for greatest efficiency.

The instant invention is designed in subsystem form, that is, the equivalent of the I/O equipment is modular in that it may handle up to 16 process control loops but the system may handle many subsystems of 16 loops each. In this way, the user is not required by buy additional capacity, except in subsystems of 16 loops, that he does not require. Further, this modular design allows an existing configuration of a certain number of 16 loops to be expanded in blocks of 16 loops. A modularity level of 16 loops appears desirable for the majority of applications but other size subsystems may easily be configurated in the same fashion.

In particular, the digital data from a computer is received by the CI which breaks the data up into three groupings. The first contains the required command instructions. The second contains the address of the one of 16 loops to be affected. The third digital word contains the value of the change to be effected. The logic module receives these three groups of signals and accepts the first into a register. Command instructions for use within the logic module are retained and those used by the CUI are passed on.

The address word is decoded and the address line of the proper CUI is activated.

The value word is handled either as an absolute position signal or incremental change depending upon the proper command instruction. If incremental, the value is used to generate a series of pulses which are passed on to the CUI. If absolute, the value is first related to the present value of the proper signal and the difference is converted into a series of pulses.

The CUI's have registers for accepting the command instructions which are supplied in parallel to all CUI's. Only the one CUI whose address line is activated will accept the command instructions. The series of pulses described above is demultiplexed in the same manner.

With the proper instructions the series of pulses is converted into an analog value and stored in a particular memory in the CUI for generating the set point (S) or the output (O). The M, O, S and status signals are collected and relayed to the logic module for eventual transmittal to the computer. The S and O signals may be transmitted to a Control Unit (CU) or the O signals may be used directly to control the process as in DDC.

The logic module also acts upon a group of signals going in the opposite direction. The measurement (M), set point (S), and output (O) signals from each of the 16 loops are collected from the CUI's, multiplexed according to the above-mentioned address line and converted into a digital word for transmittal to the computer. Parts of these digital words additionally carry status values collected from the CUI's and are multiplexed in much the same manner.

DESCRIPTION OF THE PREFERRED EMBODIMENT

FIG. 1

Figure 1:
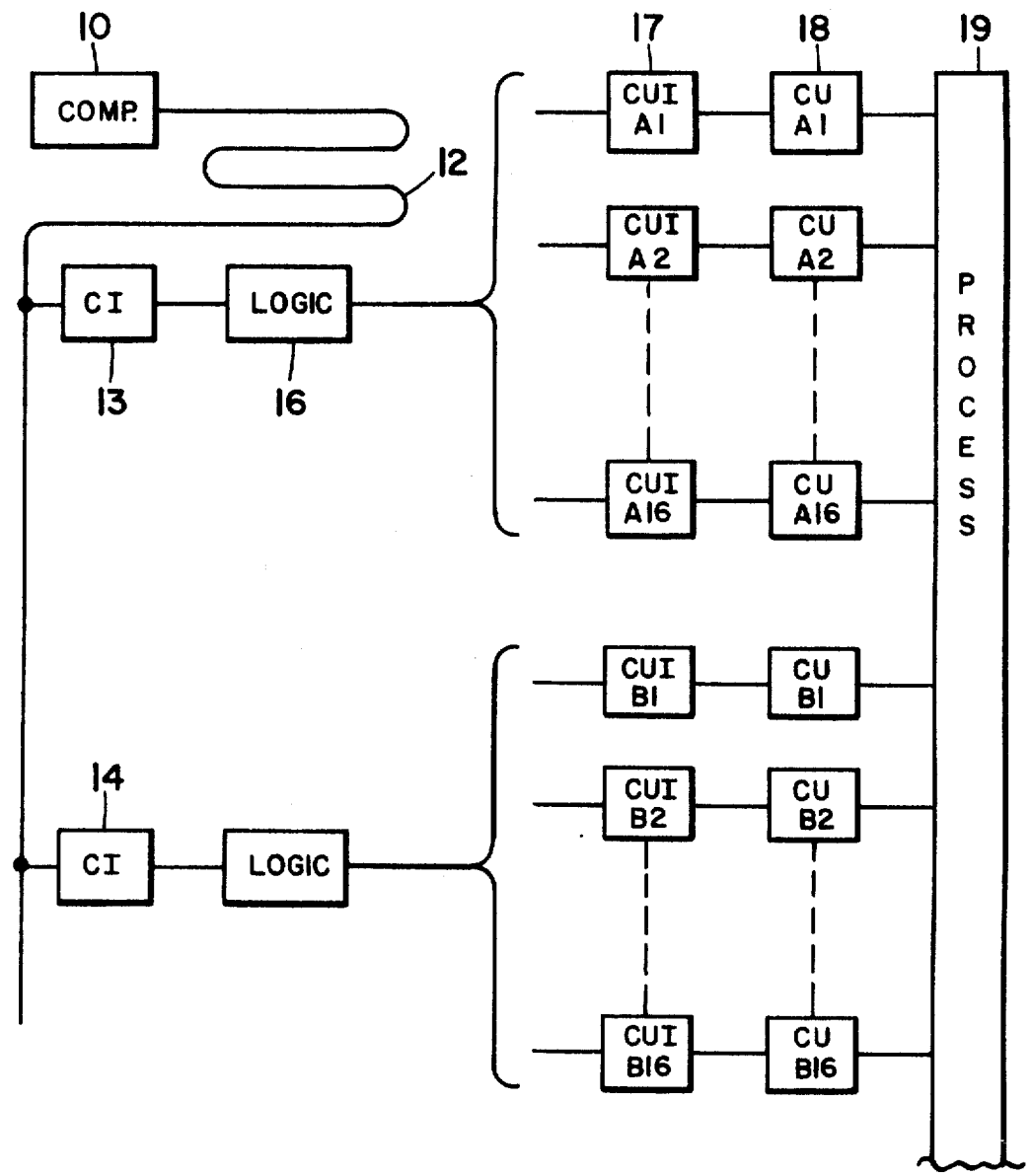
FIG. 1 represents a complete process control system with a computer.

FIG. 1 is a representation in block diagram form of a complete computer control system utilizing the instant invention. In particular, computer 10 is connected to cable 12 which may be as long as several thousand feet separating the computer from the control room area. Computer cable 12 is connected to computer interface (CI) 13. Associated with CI 13 is a maximum of 16 control loops. Additional computer interfaces, such as CI 14 which is associated with an additional 16 control loops, may be connected in parallel with CI 13 by cable 12.

Associated with CI 13 is logic module 16. CI 13 rearranges the data presented to it on computer cable 12 into the proper format for use by logic module 16. The details of the functions provided by CI 13 are not presented herein because they are accomplished by standard computer hardware in any one of a number of different manners each well known to a person having ordinary skill in the computer arts.

The details of the format of the data available to the CI from the computer depend on the particular digital computer used. The CI, however, presents a format of information to the logic module that is not altered by the choice of digital computer. It is obvious, therefore, that each digital computer type utilized in a process control system of this sort will require a specialized CI. Logic module 16, however, is of only one type and may be utilized with any digital computer.

Each logic module 16 is connected to a maximum of 16 process control loops through 16 control unit interfaces. The CUI may be connected directly to the process as in DDC or to a control unit (CU) that is connected to the process. For example, logic module 16 is connected to CUI 17 which is connected to CU 18 and the process represented as block 19. In FIG. 1 CUI 17 is represented as CUI-A1. Similarly, connected to the same logic module 16 are a maximum of 15 additional CUI's and CU's diagrammatically represented as CUI-A2 through CUI-A16 and CU-A2 through CU-A16.

The details of the workings of the CUI's will be discussed in reference to FIG. 2 below. The workings of the logic modules will be discussed in reference to FIG. 3 below. A particularly convenient and effective control unit well suited for use in the instant control system is described in co-pending U.S. Pat. Application Ser. No. 234,581 filed on Mar. 14, 1972. The interconnections between a control unit and the process are well known to those skilled in the art and require no discussion here.

FIG. 2

Figure 2:
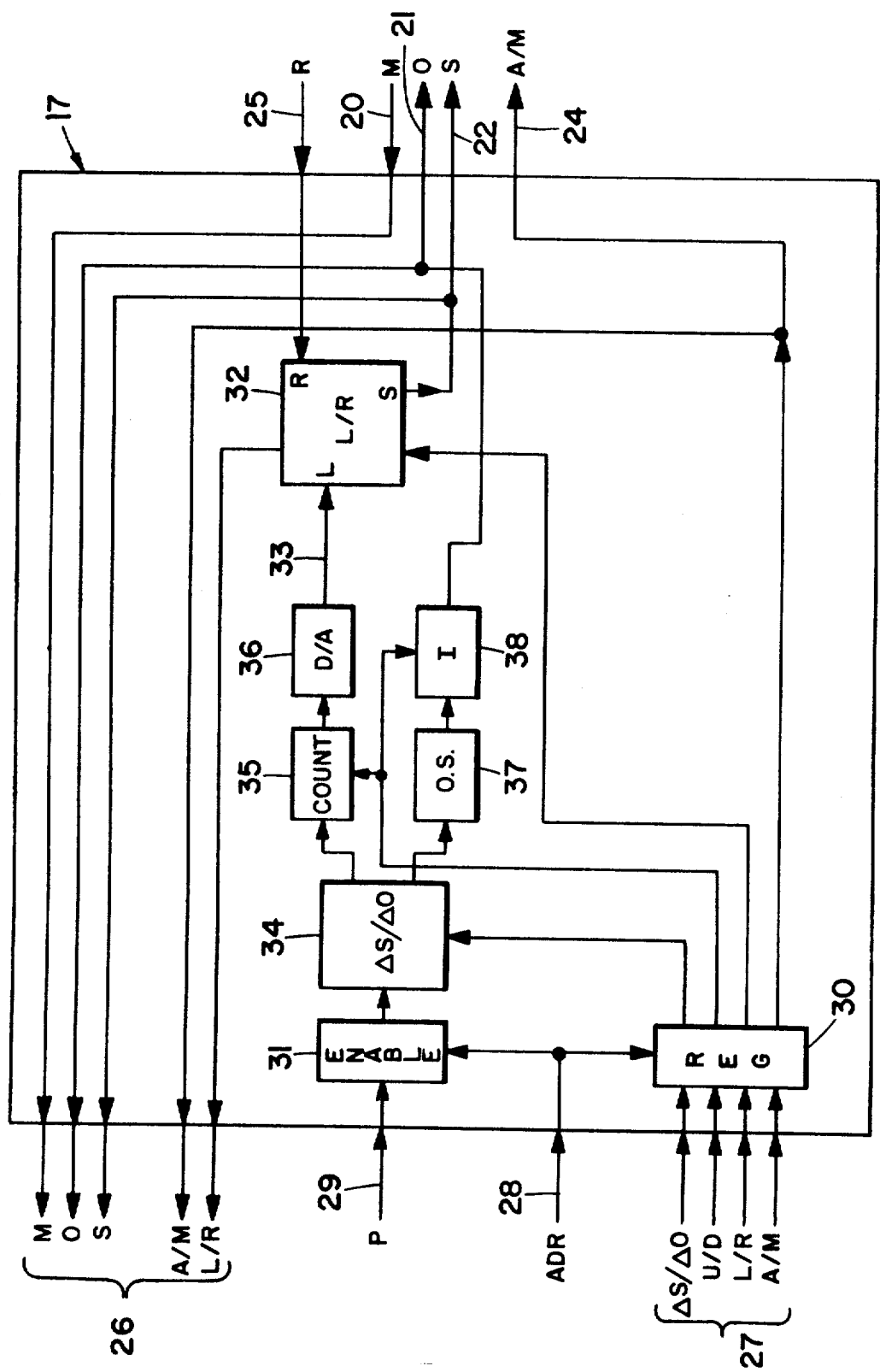
FIG. 2 shows a Control Unit Interface in greater detail.

FIG. 2 is a diagramatic representation of CUI 17 shown in FIG. 1. Signal paths 20, 21, 22 and 24 are connected directly to CU 18. In DDC systems signals 20 and 21 would be connected directly to the process. Signal 25 supplies the remotely generated set point from any suitable external analog source. The other signal paths connected to CUI 17 carry signals either generated by or being supplied to logic module 16.

These signals are comprised basically of four types. Signal group 26 carries information concerning the analog values associated with the CU at a particular instant in time along with digital status information. These signals, after suitable multiplexing, are relayed to the digital computer. Signal group 27 contains a series of decoded commands from the digital computer concering the required status and method of change of the conditions related to a particular control loop. Signal 28 contains the address information which serves to demultiplex the commands in signal group 27 and the pulse information on signal line 29 for use by the addressed control loop. It is obvious, therefore, that address line 28 peforms a demultiplexing function for each control subsystem for signals carrying information concerning status, change in status, and value of change. The multiplexing for the signals in group 26 is performed by an analog multiplexer contained within logic module 16.

CUI 17 contains input register 30 and 31 which receive the signals from group 27 and line 29 respectively. These signals, from one logic module, are connected in parallel to all CUI's in that subsystem. However, address line 28 is an individual connection between each separate CUI and the logic module. To communicate with one particular CUI, the logic module presents a signal on the proper address line 28 which activates the input register and enables the input gate for that CUI.

Register 30 processes four bits of information. Upon proper activation by address line 28 register 30 stores the output mode information (a/m) which is relayed to the control unit along signal path 24 abd fed back to the computer as part of signal group 26. Register 30 also processes the set point mode information ($l/r$) which is fed to multiplexer 32. Multiplexer 32 chooses between an externally generated remote set point available on line 25 and a locally generated set point available on line 33. The selected set point is supplied to the control unit along path 22 and is also fed back to the computer as part of signal group 26.

The other two bits of information contained in register 30 concern the method of changing a value. CUI 17 is capable of controlling two values in the CU, the set point or the output, by supplying a signal corresponding to the desired change in set point or output. Therefore, register 30 contains the information concerning change mode ($\Delta s/\Delta o$) which serves to control multiplexer 34. Multiplexer 34 receives the pulses from gate 31 and directs them to either the set point memory or the output memory. These memories may be of any common type; for purposes of explanation they are shown as two different types in FIG. 2. The set point memory is a so-called "hard memory" in which the pulses directed by multiplexer 34 are supplied to digital counter 35. The count value stored by counter 35 is transformed into an analog value by digital to analog converter 36. Counter 35 serves as a memory which stores a digital value and therefore cannot drift.

The output memory is shown as a so-called "soft memory" in that it stores an analog value. The pulses directed by multiplexer 34 are supplied to a pulse shaper such as one shot multivibrator 37 which conditions the pulses and supplies them to integrator 38. Integrator 38 stores the desired value which is supplied to the control unit along signal path 21.

A fourth bit of information contained by register 30 is the direction of change ($u/d$) which is used to control both counter 35 and integrator 38. This information serves as a sign bit for the value information contained on pulse line 29. This bit controls the memories so as to count up or down from their present value an amount related to the value supplied on pulse line 29.

It is seen, therefore, that the logic module 16 supplies a series of pulses and status commands to all the CUI's in its subsystem only one of which is activated by address line 28. The command signals determine the set point mode, the output mode and the change mode along with the direction of change.

Information communicated from the CUI to the logic module for eventual transmission to the computer consists of the three analog values on lines 20, 21 and 22 along with the digital status values related to the output and set point modes.

FIG. 3

Figure 3:
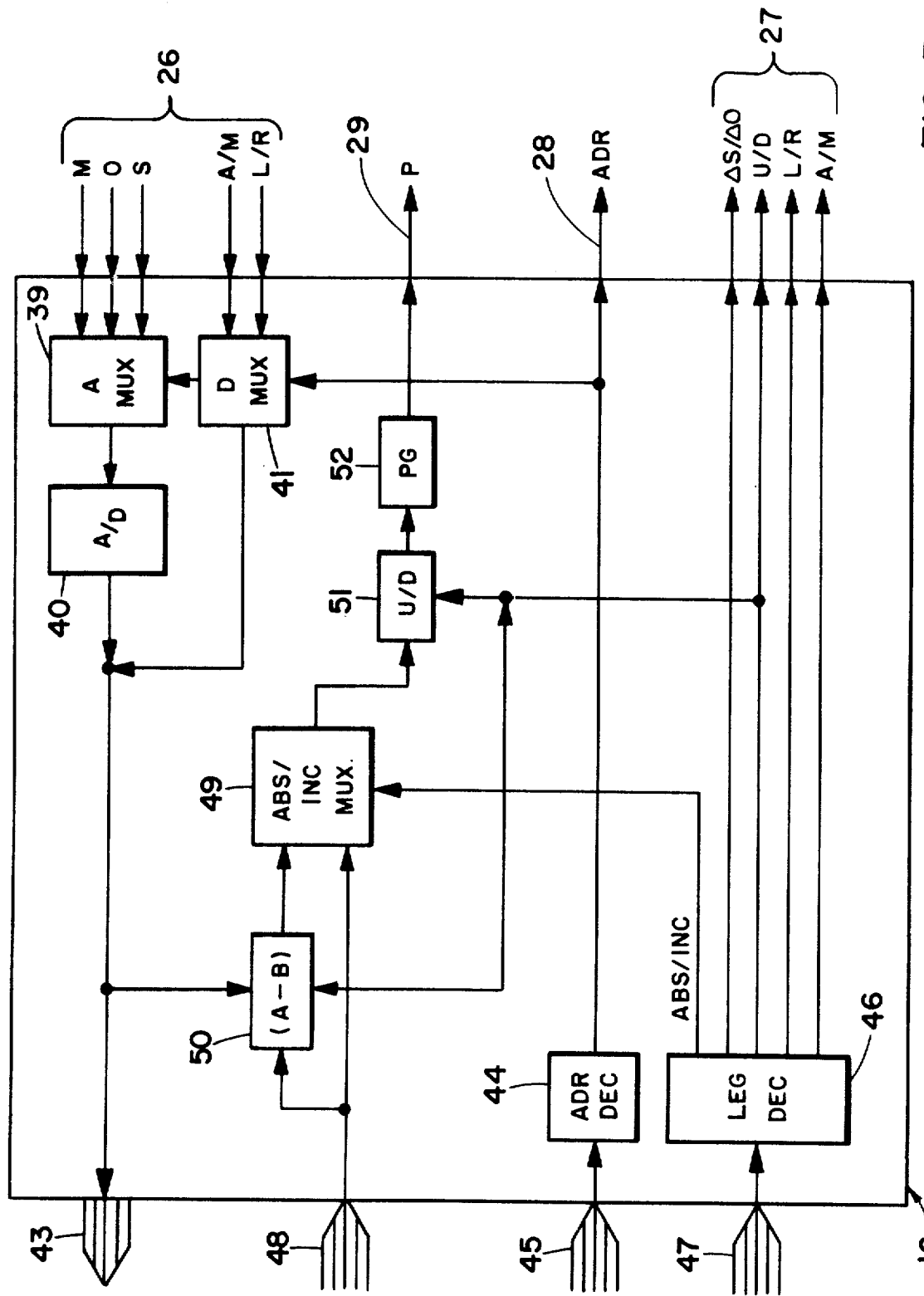
FIG. 3 shows a Logic Module in greater detail.

FIG. 3 shows a block diagram representation of logic module 16. The analog portions of the information contained in signal group 26 are handled by analog multiplexer 39. This multiplexer must choose between one of three values from one of 16 CUI's. The chosen analog value is supplied to analog to digital converter 40, the output of which is a digital word related to the chosen analog value. The status information contained in signal group is handled by digital multiplexer 41. The output of multiplexer 41 is also a digital word. These two digital words are joined together to form one longer digital word and supplied to the computer along signal group 43.

Analog multiplexer 39 and digital multiplexer 41 are both controlled by the same address signal used to demultiplex the input registers of the CUI 17. The signal on line 28 is generated from address decoder 44. This unit receives address information from the digital computer along path 45 and activates one of the 16 CUI address lines. The signals in signal group 27 are generated in legal code decoder 46. Decoder 46 receives status information from the computer on signal path 47 and with the use of internal logic decodes this information and serves to prevent improper or inconsistent status demands from being made. In addition to the four status values described in relation to FIG. 2, decoder 46 also decodes a fifth status value concerning the characterization of the change values ($abs/inc$) transmitted to logic module 16 from the digital computer along signal path 47.

The information received on signal path 48 is a digital word related to the desired analog value or change in analog value. This information is supplied directly to characterization multiplexer 49 and also to adder 50. Adder 50 serves to subtract this digital change value from the digital value representing the present position of that analog value. This current analog value is available directly from signal path 43. The output of adder 50 is connected to multiplexer 49.

Multiplexer 49 must choose between a value received directly from the computer or the difference between the current value and the value supplied from the computer. The output of this multiplexer is a digital word supplied to up-down counter 51. This counter, controlled by the status information ($u/d$) contained in signal group 27 or by adder 50, converts the digital word into a number of pulses by controlling pulse generator 52. The output of pulse generator 52 on signal path 29 is, therfore, a series of pulses the number of which is related to the digital value supplied by the computer along path 48.

Although a preferred embodiment of the invention has been described, it is apparent that many alterations and additions may be made to the device described without departing from the spirit and the scope of the invention. In particular, it is quite convenient to have the system carry information in addition to that described herein. For example, in addition to the status information concerning the output and set point modes related to each control unit, the system may easily be modified to carry other status information, such as computer fail, on/off display, on/off computer or any other related information. Additional command instructions and even additional analog values may be carried by the system by simply adding the required hardware in the same fashion as described herein.

It is also apparent that additional hardware may be desirable between the computer and the CI. For example, depending upon the type and capacity of the computer used and the number of control loops required, various other equipment might be necessary to allow the computer to choose between the subsystems and control the order in which communication is achieved. Equipment to convert between serial and parallel format might also be required between the CI and the computer.

It it is also possible, and in certain instances highly desirable, with the instant invention to utilize the direct memory access features available with many computers. Nonetheless, it is well within the skill of the art of those normally dealing with the design and configuration of digital computers to construct the variations and additions described immediately above if access is available to the features and capabilities of the instant invention.

I claim:

1. An improved electronic process control system of the type normally having a plurality of control units intimately related to a process to be controlled and a digital computer arranged to receive certain signals from the control units and send signals to the control units to modify their actions, wherein the improvement comprises:

computer interface means connected to the computer for a converting between the digital format of the computer and a prearranged digital format;

a plurality of control unit interface means connected to the control units for generating and storing analog and status signals required by the control units;

means to generate a series of pulses for use by the control unit interfaces corresponding to a digital word from the computer operable in one of two modes, the first mode being incremental wherein the series of pulses is directly related to the digital word, the second mode being positional whrein the series of pulses is related to the difference between the digital and the present value in the control unit; and means to generate a digital word for use by the computer corresponding to analog signals received from the control units.

2. The control system of claim 1 further including: address lines connected to the individual control unit interfaces, and means for demultiplexing an address signal from the digital computer by activating one of the address lines.

3. The control system of claim 2 wherein the control unit interface means includes:

gating means for receiving the series of pulses in parallel with other unit interfaces, the gating means allowing the signals to pass only upon the presence of a properly activated address line.

4. The control system of claim 3 wherein the control unit interface further includes:

a plurality of memory means for storing analog values related to the series of pulses passed; and switching means for determining which of the memory means are to be activated by the analog value upon command from the computer.

5. A DDC process interface system for use with a digital computer having computer interface circuitry for translating between the digital format of the computer and a prearranged digital format including command, address, digital output value, and digital input value information, and a plurality of devices cooperating with the process to be controlled, the interface system comprising:

a plurality of control unit interfaces for transmitting analog signals to the devices;

a plurality of address lines each connected to an individual control unit interface;

an address decoder for activating individual address lines based on the address information;

a plurality of command lines connected in parallel to interfaces for transmitting the command information;

a command code register associated with each control unit interface operable to record the present status of the command lines when activated by the corresponding address line;

a pulse line connected to the analog control unit interfaces;

a pulse generator assembly for generating a series of pulses on the pulse line based on the digital output value information;

a pulse enabling gate associated with each control unit interface for passing the pulses on the pulse line when activated by the corresponding address line;

a pulse converter associated with each gate for converting the pulses into an analog value for transmission to the devices cooperating with the process to be controlled;

an analog input value line associated with each control unit interface for collecting analog value information related to the corresponding control unit;

an analog multiplexer to which all analog input value lines are connected, the multiplexer being connected to the address decoder and activated thereby to multiplex the analog input value line corresponding to the address line activated; and an anlog to digital converter for converting the analog value on the analog input value line to digital input information for the computer.

6. The DDC process interface system of claim 5 with setpoint tracking, further comprising;

a second pulse converter associated with each gate for converting pulses into a second analog value for transmission to the devices cooperating with the process to be controlled; and a setpoint/output switch inserted between the pulse enabling gate and the first and second pulse converter of each control unit interface for directing the pulses to one of these converters according to the status of the command code register associated with the same control unit interface, whereby the first analog value may be utilized as a computer generated output value and the second analog value utilized as a computer generated setpoint value.

7. The DCC system of claim 6 wherein the first pulse converter in each control unit interface comprises:

a pulse shaper for generating a predetermined pulse shape in response to each pulse received on the pulse line; and an integrator for storing and integrating the predetermined pulse shapes to generate the first analog value.

8. The DDC system of claim 7 wherein the second pulse converter in each control unit interface comprises:

a pulse counter for generating a digital value related to the number of pulses received; and a digital to analog converter for generating the second analog value.

9. The DDC system of claim 5 with remote/local setpoint switching, further comprising:

a remote/local switch in each control unit interface for receiving the second analog value and another analog value and transmitting one of these analog values to the devices cooperating with the process to be controlled according to the status of the command code register associated with the same control unit interface, whereby the computer may choose between the setpoint value locally generated by the computer and another setpoint value remotely generated.

10. The DDC process interface system of claim 5 with absolute/incremental ability, further comprising:

an absolute/incremental switch associated with each pulse generator for receiving the digital output value information and another digital output value signal and transmitting one of these digital values to the pulse generator according to the command code information; and means for combining the digital output value information from the computer to the digital input information from the analog to digital converter to generate the other digital output value signal for the absolute/incremental switch, whereby the analog value transmitted to the devices cooperating with the process to be controlled may be either the absolute value determined by the computer or an incremental value related to the difference between the absolute value and a present value.

11. The DDC system of claim 5 further comprising:
a digital multiplexer associated with each analog multiplexer for combining digital status information regarding the present status of the control unit interface and the devices with the output of the analog to digital converter to form composite digital input value information.

12. The DDC system of claim 5 further comprising:
a legal code decoder for determining the validity of the present combination of information on the command code lines.

13. The DCC system of claim 5 wherein the control unit interfaces are arranged in sub-systems of a maximum of a predetermined number of units each, further comprising:
an additional set of address decoders, pulse generators, analog multiplexers, and analog to digital converters for each sub-system beyond one.

* * * * *